Oct. 27, 1931.  H. N. WYLIE ET AL  1,829,696
RIVETING TOOL
Filed March 3, 1931    2 Sheets-Sheet 1

Inventors:
Hamilton Neil Wylie
and Percy George Crabbe,
By Mawhinney & Mawhinney,
Attys.

Oct. 27, 1931.  H. N. WYLIE ET AL  1,829,696
RIVETING TOOL
Filed March 3, 1931  2 Sheets-Sheet 2
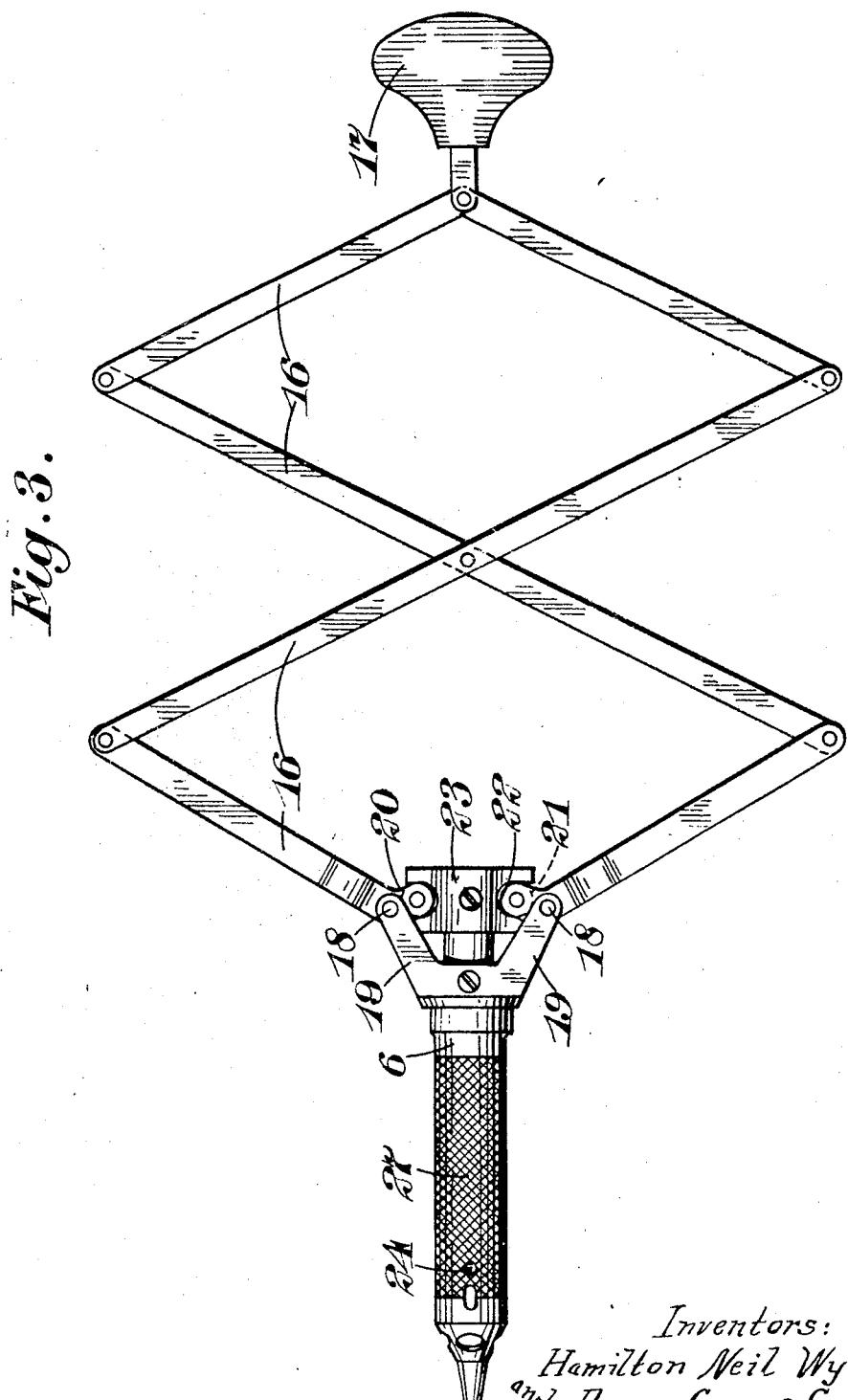

Patented Oct. 27, 1931

1,829,696

UNITED STATES PATENT OFFICE

HAMILTON NEIL WYLIE AND PERCY GEORGE CRABBE, OF COVENTRY, ENGLAND, ASSIGNORS TO SIR W. G. ARMSTRONG WHITWORTH AIRCRAFT LIMITED, OF COVENTRY, ENGLAND

RIVETING TOOL

Application filed March 3, 1931, Serial No. 519,858, and in Great Britain April 7, 1930.

This invention relates to a tool for use in setting or fixing pierced or tubular rivets, of the kind in which the rivet is mounted on a mandrel having an enlarged head so that, when the rivet is inserted in position, by thrusting upon the end of the rivet and simultaneously pulling upon the mandrel the latter's head expands and upsets the rivet. The plain stem of the mandrel projecting beyond the rivet end can then be screw-threaded to receive a nut or otherwise adapted for securing attachments, or it may be cut off short or even pushed back. Alternatively, the riveting operation may be such as is described in British patent specification No. 286,471, in which the mandrel head is drawn completely through the rivet.

The object of the invention is to provide a reliable portable tool by which the fixing of such rivets can be easily and quickly accomplished.

A portable tool for effecting these riveting operations, according to the present invention, involves an axially-slidable member which first causes a collet to grip the mandrel and then moves the collet and mandrel axially in the course of its axial movement in one direction. When operated in the other direction the mandrel is released at the end of the stroke.

Figure 1:
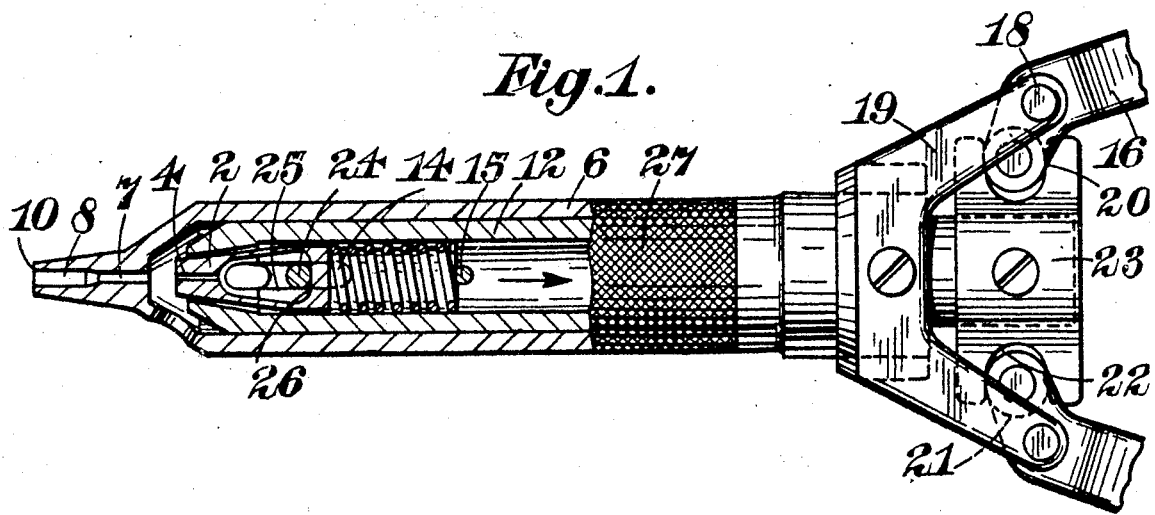
Figure 2:
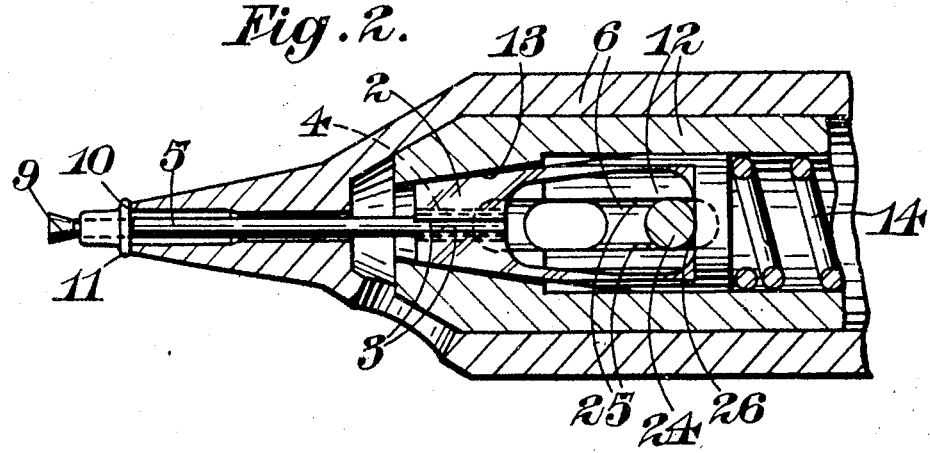

In the accompanying drawings,

Figure 1 is a fragmentary elevation, partly in section, of a tool constructed in accordance with the invention, Figure 2 is a view, to a larger scale, of part of the tool shown in section in Figure 1 and showing a rivet and mandrel in position in the tool prior to the drawing of the mandrel into or through the rivet, and Figure 3 is an elevation to a smaller scale of the complete tool.

Like numerals indicate like parts throughout the drawings.

In this construction of tool, which is particularly suitable for riveting in the manner described in the British patent specification aforementioned, the collet 2 is split at 3 to provide spring jaws and the bore 4 is internally serrated to grip the mandrel 5. The collet is disposed within a hollow casing 6, the forward end of which is drilled at 7 to receive the mandrel stem with clearance, the outer portion 8 of the bore being wide enough to receive the enlarged mandrel head 9 (Figure 2) after the same has been contracted. The forward end of the casing is also provided with a flat nose 10 adapted to engage the appropriate face of the rivet end or head 11 to hold the rivet in position against the member to be riveted.

The collet is externally tapered down to its forward edge and disposed within an axially-slidable sleeve 12 which is in turn mounted in the casing 6. The sleeve is internally tapered at 13 at its forward end to agree with the taper on the collet. A coil spring 14 located within the sleeve 12 operates between the rear face of the collet and a transverse pin 15 carried by the sleeve.

Thus, when the sleeve 12 is moved axially in the direction of the arrow in Figure 1 the spring 14 tends to hold the collet 2 stationary whilst the engagement of the tapered faces on the collet and sleeve, respectively, causes the collet jaws to contract on to the mandrel and to hold it firmly, whereafter further axial movement of the sleeve 12 draws back the mandrel and collet together.

A convenient operating mechanism is shown in Figure 3 and involves the use of lazy-tongs 16, 16 provided at their rear end with a push knob 17 or other suitable grip and hinged at two points 18, 18 at their forward end on two oppositely-disposed arms 19, 19 formed on the rear of the casing 6. The forward links 16 of the lazy-tongs mechanism are offset at 20 beyond their pivotal mountings and carry rollers 21 which engage, with ample clearance, oppositely-disposed recesses 22 in a block 23 which is adjustably secured to the sleeve 12. For example, the block may be threaded on the adjacent rear end of the sleeve and provided with a peripheral groove to receive the rollers.

Thus, when the lazy-tongs mechanism is compressed the outward movement of the links causes the inner ends 20 of the forward links to operate upon the block 23 to with-draw the same axially, thereby withdrawing the mandrel.

When the lazy-tongs mechanism is elongated the block and attached sleeve travel inwardly. To effect release of the mandrel at the end of the inward travel, a transverse pin 24 secured to the casing and extending through slots 25 in the sleeve is arranged to engage the part 26 of the collet to limit its forward movement, so that the last portion of the inward axial movement of the sleeve is unaccompanied by any axial movement of the collet, thus allowing the collet jaws to open to release the mandrel.

The greater portion of the outer surface of the casing 6 is roughened at 27 to provide a hand grip for the operator.

It will be evident that the collet need not be a sprung member; for example, it may comprise two jaws hinged together.

The collet may carry oppositely-disposed ears (not shown) engaging these slots 25 in the sleeve so as to be held against rotation.

In operation a rivet should first be placed on the mandrel with its head 11 away from the enlarged mandrel end 9, and the mandrel stem then inserted through the bore 7, 8 of the casing into the mouth of the collet. The tool is then taken to the work to be riveted, and the mandrel head and the main portion of the rivet pushed through the hole in the work so that the rivet head 11 is gripped between the work and the nose of the tool. The lazy-tongs mechanism 16 is then compressed fully, to effect the withdrawal of the mandrel through the rivet in the manner described, and can finally be elongated as the tool is being taken away from the work to eject, or at all events to release, the mandrel.

It will be seen, therefore, that the setting of pierced or tubular rivets can be very simply and expeditiously performed by means of the tool of the present invention.

What we claim as our invention and desire to secure by Letters Patent of the United States is:—

1. A tool for affixing a pierced or tubular rivet by drawing a mandrel into it, comprising a collet, an axially-slidable member, and means whereby axial movement of the latter in one direction causes the collet to grip the mandrel and then to move the collet and mandrel together.

2. A tool for affixing a pierced or tubular rivet, including a split externally-tapered collet adapted for engaging and gripping the mandrel, an internally-tapered member which surrounds the collet, and means whereby the internally-tapered member, when moved axially in one direction, first causes the collet to grip the mandrel and thereafter moves these two members together.

3. A tool for affixing a pierced or tubular rivet, including two telescopic tubes, a lazy-tongs mechanism by which the inner tube is movable endwise whilst the other is being forced against the rivet, a split collet within the inner tube, and means whereby the collet, when the inner tube is moved axially in one direction, is caused to grip the mandrel and then move it endwise.

4. A tool for affixing a pierced or tubular rivet, including an axially-movable member, a collet, means whereby the collet is caused to grip the mandrel and draw it into the rivet by axial movement in one direction of the movable member, and means co-operating with the collet for effecting release of the mandrel from the collet on the opposite movement of the movable member.

5. A tool for affixing a pierced or tubular rivet, including three telescopic members, the inner member being longitudinally split, operating mechanism connected to the intermediate member for effecting relative axial movement thereof, means whereby the inner member is contracted on to the mandrel and thereafter moved with the mandrel by movement of the intermediate member in one direction, a stop, and a spring arranged so that, on movement in the opposite direction, the inner member is returned to the stop after which, on further movement of the intermediate member, the inner member opens to release the mandrel.

6. A tool for affixing a pierced or tubular rivet, including a hollow casing, one end being adapted to receive the mandrel, a sleeve slidable within the casing, a lazy-tongs mechanism connected both to the casing and to the sleeve for operating the latter, a mandrel-gripping collet within the sleeve, wedge surfaces such that on relative axial movement of the sleeve and collet in one direction the latter will be caused to grip, a spring operating between the sleeve and collet to bias the latter in a gripping direction, a stop acting on the collet to prevent the gripping thereof when the sleeve is in a predetermined position, and means interconnecting the sleeve and collet whereby the latter is moved on the moving of the sleeve.

7. A tool for affixing a pierced or tubular rivet, including a hollow casing, one end being adapted to receive the mandrel and to engage the rivet, oppositely-disposed arms at the other end of the casing, this other end being open, a lazy-tongs mechanism pivoted on the arms, a sleeve slidable within the casing, a block at the end of the sleeve adjacent the arms, opposite recesses in the block, offset portions on the lazy-tongs adapted to engage the recesses, such that contraction and elongation of the lazy-tongs reciprocates the sleeve, a spring collet within the sleeve adjacent the end remote from the block, an external taper on the collet jaws, an internal taper on the adjacent end of the sleeve, opposite longitudinal slots in the sleeve near that end, a pin carried by the casing and accommodated in the slots, the pin acting to limit the return motion of the collet, and a spring acting between means internally of the sleeve and the collet to return the latter.

In testimony whereof we have signed our names to this specification.

HAMILTON NEIL WYLIE.
  PERCY GEORGE CRABBE.